United States Patent [19]

Bröhl et al.

[11] Patent Number: 4,823,765

[45] Date of Patent: Apr. 25, 1989

[54] STEAM CHEST MOLD FOR MAKING A RECTANGULAR-SECTION FOAM BLOCK

[75] Inventors: Franz-Josef Bröhl, Geldern-Pont; Lothar Finck, Duisburg, both of Fed. Rep. of Germany

[73] Assignee: Munchow & Huhne Maschinenbaugesellschaft mbH, Duisburg, Fed. Rep. of Germany

[21] Appl. No.: 142,372

[22] Filed: Jan. 11, 1988

[30] Foreign Application Priority Data

Jan. 9, 1987 [DE]  Fed. Rep. of Germany ....... 3700479

[51] Int. Cl.[4] .............................................. B29D 27/00
[52] U.S. Cl. ..................................... 425/4 R; 264/51;
                           425/388; 425/405.1; 425/407
[58] Field of Search .................... 264/51, 53; 425/4 R,
        425/817 R, 387.1, 388, 425.1, 407, 408, 444, 446

[56] References Cited

U.S. PATENT DOCUMENTS

| | | | |
|---|---|---|---|
| 3,941,528 | 3/1976 | Cotterell | 425/4 R |
| 4,327,045 | 4/1982 | Nishikawa et al. | 264/51 |
| 4,439,122 | 3/1984 | Besse et al. | 425/4 R |
| 4,695,416 | 9/1987 | Treffner et al. | 425/4 R X |

FOREIGN PATENT DOCUMENTS 1905662 1/1973 Fed. Rep. of Germany .
2152248 2/1974 Fed. Rep. of Germany .

OTHER PUBLICATIONS

"Expandierbares Polystyrol" EPS-VDI Verlag GmbH, pp. 68 & 69, (date unknown).

Primary Examiner—Charles Hart
Attorney, Agent, or Firm—Herbert Dubno

[57] ABSTRACT

The mold for making a rectangular foam block from a plurality of blowable and sinterable plastic pieces, especially foamed polystyrene pieces, with the help of steam comprises a rectangular inner mold with a plurality of inner mold walls movable from each other and an outer mold tightly closable surrounding the inner mold having at least one steam inlet and an air evacuation and vacuum pump connector pipe. This mold is especially easy to construct when the outer mold comprises a pipelike pressurizable container with a front mold wall comprising a pressure-tight door and with a block ejector mounted in a rear mold wall which can be pushed approximately perpendicularly to the rear mold wall into the inner mold.

10 Claims, 2 Drawing Sheets

STEAM CHEST MOLD FOR MAKING A RECTANGULAR-SECTION FOAM BLOCK

FIELD OF THE INVENTION

Our present invention relates to a mold for making a foam block and, more particularly, to a steam-chest mold for making a rectangular-section foam block from blowable and sinterable plastic particles, especially prefoamed polystryene beads, with the use of steam.

BACKGROUND OF THE INVENTION

Rectangular-section foam blocks are commonly made from a mass of blowable and sinterable plastic particles, especially prefoamed polystyrene beads, by steam in a steam chest mold. The mold can comprise a rectangular inner mold with a plurality of inner mold walls movable from each other and having a multiplicity of processing openings and an outer mold tightly closable and surrounding the inner mold, the outer mold casing having at least one steam inlet and an air venting and vacuum pump connector pipe.

In the known mold the inner mold construction and the outer mold are integrated with each other by constructing the single walls as double walls in such away that the inner mold and the outer mold perform practically no functions independently of each other.

This structure is comparatively expensive because the individual walls must have a sufficient rigidity for a tight seal and seals subject to wear are used between the individual walls.

OBJECTS OF THE INVENTION

It is an object of our invention to provide an improved steam-chest mold for making a rectangular foam block which will overcome these drawbacks.

It is also an object of our invention to provide an improved mold for making a rectangular foam block which on the one hand seals tightly and on the other hand can be used to obtain the exact rectangular shape desired for the manufactured foam block with substantially simpler technical means.

It is another object of our invention to provide an improved mold for making an accurately rectangular foam block which is more economically and easily constructed.

SUMMARY OF THE INVENTION

These objects and others which will become more readily apparent hereinafter are attained in accordance with our invention in a mold for making a rectangular foam block from a mass of blowable and sinterable plastic particles, especially prefoamed polystyrene beads, using steam, comprising a rectangular inner mold with a plurality of inner mold walls movable from each other and an outer mold tightly closable surrounding the inner mold having at least one steam inlet and an air evacuation and vacuum pump connector pipe.

According to our invention the outer mold comprises a pipelike (cylindrical) pressurizable container with a front mold wall comprising a pressure-tight door and with a block ejector mounted in a rear mold wall which can be pushed approximately perpendicularly to the rear mold wall into the inner mold.

Our invention is based our discovery that the desired results can be obtained with comparatively simple technical means when the function of the inner mold, namely to make the block with an exactly rectangular shape, and the function of the outer mold, namely to guarantee a tight pressure seal, are realized in functionally separate structures.

Because of this our invention utilizes an autoclave-like pressurizable container which forms the outer mold and in which the inner mold is expandable for removal of the block. The removal of the manufactured block is effected through the pressure-tight door. The block ejector provided at the opposite end is useful when the block to be pushed out is not released from the inner mold walls without some additional effort.

Advantageously the pressure-tight door can be provided with a hydraulically or pneumatically operable door closure or latching device.

The block ejector is advantageously a piston-and-cylinder device. It can then form a part of the inner wall with its piston in its resting position. The filling of the inner mold with the plastic particles to be blown and sintered is effected appropriately through the rear mold wall.

Advantageously the piston-and-cylinder device simultaneously forms a feed device for the plastic particles and is provided with a branch for this purpose.

It is particularly desirable when the manufactured block is removed from the inner mold by a block ejector mounted eccentrically in the rear mold wall.

In regard to the construction of the inner mold, advantageously the inner side mold walls can pivot with their upper ends on the associated outer ends of the inner mold cover wall and their lower ends can be mounted on at least one eccentric drive with whose help they are movable from each other and pressable upwardly from each other.

The ends of the inner mold can be connected with the corresponding walls of the outer mold as has been the case up to now. They can be double walls and/or a double door.

So that the steam fed in by the steam inlet into the pressurizable container does not bypass the inner mold and go directly to the air evacuation and vacuum pump connector pipe, the steam inlet opens advantageously into a hollow space between the outer mold and the inner mold while the inner mold cover walls are suspended by two longitudinally running U-shape rubber or plastic supporting members in the pressurizable container.

The air evacuation and vacuum pump connector pipes open between these supporting members. Thus the steam can reach the air evacuation and vacuum pump connector pipe only through the processing openings in the inner mold walls. In the known mold often a condensor having a plurality of water spray nozzles connected with a vacuum pump is used. It acts as an external condensor in the molds used up to now, but in the mold of our invention can be mounted in a hollow space provided in the mold. In particular it is especially desirable when the water spray nozzles are provided in longitudinal pipes running adjacent the inner mold side walls, under which a plurality of collector gutters are located.

BRIEF DESCRIPTION OF THE DRAWING

The above and other objects, features and advantages of our invention will become more readily apparent from the following specific description, reference being made to the accompanying drawing in which.

SPECIFIC DESCRIPTION

Figure 1:
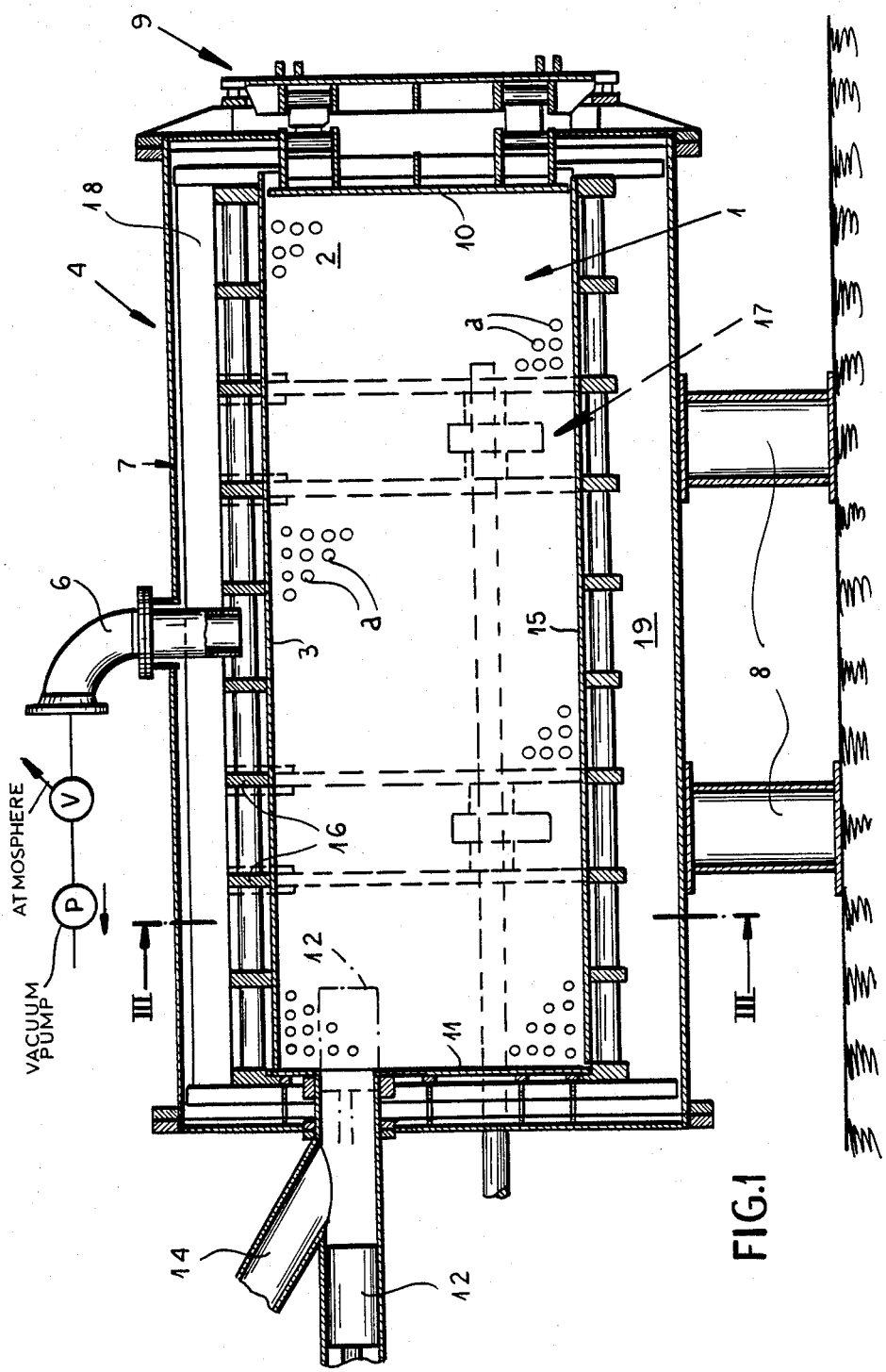
FIG. 1 is a longitudinal cross sectional view through a mold for making a foam block according to our invention.

The mold shown in the drawing is used to make a rectangular-section foam block from a plurality of blowable and sinterable plastic particles with steam Particularly prefoamed polystyrene parts or pieces can be used. The mold basically comprises a rectangular inner mold 1 with inner mold walls 2, 3 movable from each other having processing openings a throughout which steam reaches the polystyrene beads and an outer mold 4 closable tightly surrounding the inner mold 1 with a steam inlet 5 and an air evacuation and vacuum pump connector pipe 6.

As one can see from FIG. 1 the outer mold 4 comprises a pipelike pressurizable container 7 mounted on a support 8.

The front wall of the outer mold 4 comprises a pressure-tight door 9. The pressure-tight door 9 simultaneously supports and carries the inner front wall 10 of the inner mold.

In the corresponding rear end mold wall 11, a block ejector 12 is mounted which can be pushed approximately perpendicularly to this rear-end mold wall 11 until in the inner mold 1. The rear end wall 11 is an end wall for both molds.

Figure 2:
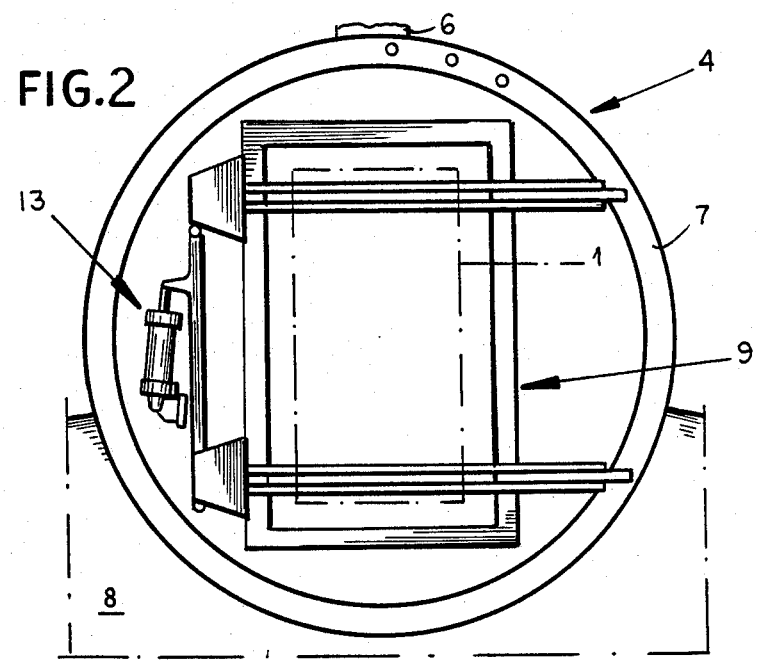
FIG. 2 is a front elevational view of the mold shown in FIG. 1.

In particular the pressure-tight door 9 is provided with a hydraulically or pneumatically operable door closer device 13 (see FIG. 2). On the other end the block ejector 12 is constructed like a piston-and-cylinder device (see FIG. 1). This piston-and-cylinder device is simultaneously formed as a feed device for the plastic particles and furthermore is provided with a cylindrical branch 14. The block ejector 12 is mounted eccentrically in the rear mold wall 11 to make the release or ejection of a block from the inner mold 1 easier As one can see from FIG. 3 the inner mold bottom 15 is rigidly mounted in he pressurizable container 7 while the inner mold side walls 2 and the inner mold cover wall 3 are movable and provided with a plurality of reinforcing members 16.

In particular the inner mold side walls 2 are pivotable with their upper ends on the associated outer ends of the inner mold cover wall 3 and are supported or mounted with their lower ends on an eccentric drive 17 with whose help they are pressable upwardly and from each other. The eccentric drives 17 are supported or guided toward the outside by the rear mold wall !1 (see FIG. 1).

The inner mold cover wall 3 is suspended by two longitudinally running U-shaped rubber or plastic supporting members 18 in the head or upper region of the pressurizable container 7.

The air evacuation and vacuum pump connector pipe 6 opens between these rubber or plastic supporting members 18. These rubber or plastic supporting members 18 also function as steam or moisture chamber blocks or locks because they take care that steam fed into the hollow space 19 between the inner mold 1 and the pressurizable container 7 can only be drawn off through the inner mold 1.

Figure 3:
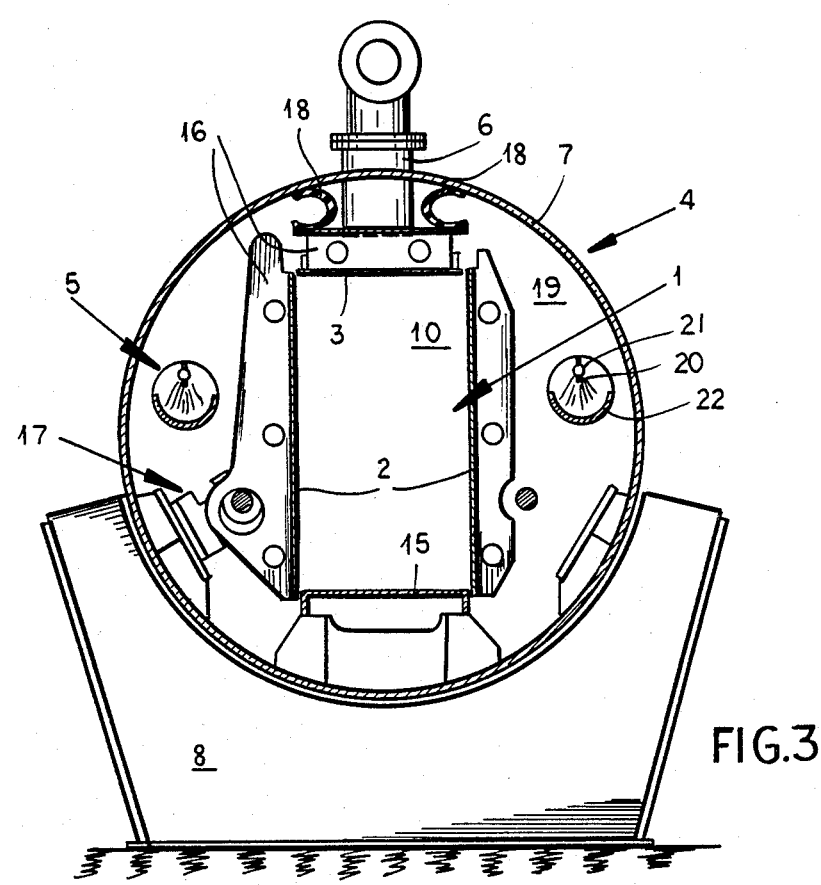
FIG. 3 is a cross sectional view through the mold shown in FIG. 1 taken along the section lines III—III of FIG. 1.

FIGS. 1 and 3 show that the mold is provided with a condensor having a plurality of water spray nozzles 20 connected to the unshown vacuum pump. This condensor is located in the already mentioned hollow space 19.

Moreover the water spray nozzles 20 are provided in longitudinally running pipes 21 extending along the inner mold side walls 2, under which collector gutters 22 into which the water spray nozzles 20 spray are positioned.

We claim:

1. In a mold for making a rectangular foam block from a plurality of blowable and sinterable plastic particles, especially prefoamed polystyrene pieces, with the help of steam comprising a rectangular inner mold with a plurality of inner mold walls movable from each other and an outer mold tightly closable surrounding said inner mold and having at least one steam inlet and an air evacuation and vacuum pump connector pipe, the improvement wherein said outer mold comprises a pipelike pressurizable container with a front mold wall comprising a pressure-tight door and with a block ejector mounted in a rear mold wall which can be pushed approximately perpendicularly to said rear mold wall into said inner mold, the inner mold side walls of said inner mold walls being pivotable with the upper ends of said inner mold side walls on the associated outer ends of an inner mold cover wall of said inner mold walls and being mounted with the lower ends of said inner mold side walls on at least one eccentric drive by means of which said inner mold side walls are movable from each other and pressable upwardly from each other.

2. The improvement according to claim 1 wherein said pressure-tight door is provided with a hydraulically or pneumatically operable door closure device.

3. The improvement according to claim 1 wherein said block ejector comprises a piston-and-cylinder device.

4. The improvement according to claim 3 wherein said piston-and-cylinder device is simultaneously a feed device for said plastic pieces and further is provided with a cylindrical branch.

5. The improvement according to claim 1 wherein said block ejector is mounted eccentrically in said rear mold wall.

6. The improvement according to claim 1 wherein said inner mold cover wall is suspended by two longitudinally running U-shape rubber or plastic supporting members in said pressurized container, between which said air evacuation and vacuum pump connector pipe opens.

7. In a mold according to claim 1 in which a condensor is provided including a plurality of water spray openings, the improvement wherein said condensor is located in a hollow space between said inner mold and said pressurizable container.

8. The improvement according to claim 7 wherein said water spray nozzles are provided in a plurality of longitudinal pipes running adjacent said inner mold side walls, under which a plurality of collector gutters are located.

9. A mold for making a rectangular foam block from a plurality of blowable and sinterable plastic particles, especially prefoamed polystyrene pieces, with the help of steam comprising:
   a rectangular inner mold with a plurality of inner mold walls movable from each other; and
   an outer mold tightly closable surrounding said inner mold having at least one steam inlet and an air evacuation and vacuum pump connector pipe, said outer mold comprising a pipelike pressurizable container with a front mold wall comprising a pressure-tight door having a hydraulically or pneumatically operable closure device device and with a block ejector mounted eccentrically in a rear mold wall which can be pushed approximately perpendicularly to said rear mold wall into said inner mold, the inner mold side walls of said inner mold walls being pivotable with the upper ends of said inner mold side walls on the associated outer ends of an inner mold cover wall of said inner mold walls and being mounted with the lower ends of said inner mold side walls on at least one eccentric drive with whose help said inner mold side walls are movable from each other and pressable upwardly from each other and said inner mold cover wall being suspended by two longitudinally running U-shape rubber or plastic supporting members in said pressurized container, between which said air evacuation and vacuum pump connector pipe opens.

10. A mold according to claim 9 wherein a condensor is provided including a plurality of water spray nozzles, said condensor being located in a hollow space between said inner mold and said pressurizable container and said water spray nozzles being provided in a plurality of longitudinal pipes running adjacent said inner mold side walls, under which a plurality of collector gutters are located.

* * * * *